United States Patent [19]

Hoki et al.

[11] 4,289,857

[45] Sep. 15, 1981

[54] FOAMABLE POLYMERIC COMPOSITIONS

[75] Inventors: Tsuneo Hoki; Nobuo Miura; Hiroshi Watanabe, all of Suzuka, Japan

[73] Assignee: Asahi-Dow Limited, Tokyo, Japan

[21] Appl. No.: 174,297

[22] Filed: Jul. 31, 1980

[51] Int. Cl.³ .............................. C08J 9/10; C08J 9/14
[52] U.S. Cl. .................................. 521/85; 521/79; 521/143; 521/144; 521/146; 521/147; 521/149
[58] Field of Search .................. 521/79, 85, 146, 147, 521/143, 144, 149

[56] References Cited

U.S. PATENT DOCUMENTS 3,558,752  1/1971  Seu ........................................ 521/79
3,644,230  2/1972  Cronin ................................. 521/79

*Primary Examiner*—Morton Foelak

[57] ABSTRACT

The dimensional stability of closed-cell synthetic polymer foams can be notably improved by the incorporation therein, during their preparation, of from about 0.1 to about 10 percent by weight (based upon the weight of the synthetic resin) of certain borate or phosphinate glycol ester compounds such as, for example, tri(1-stearyl-glycero)borate, tri(monostearylpolyoxyethyleneglycol)borate, di(1-stearylglycero)phosphinate, and the like.

4 Claims, 2 Drawing Figures

FOAMABLE POLYMERIC COMPOSITIONS

BACKGROUND OF THE INVENTION

This invention relates to foamable synthetic resin compositions containing in the thermoplastic synthetic resin an amount of 0.1 to 10% by weight of one or more compounds which have the actions of inhibiting escape of foaming agent gas from the foamed substance, of increasing the gas efficiency of the foaming agent and of preventing marked contraction of the foamed substance.

In general, thermoplastic resin foams are manufactured by incorporating a foaming agent into the resin in heat plastified form and by gasifying the foaming agent to thereby form the desired thermoplastic resin foam. Foaming agents typically employed can oftentimes be relatively expensive materials. Thus, improvement of gas efficiency of said foaming agent is of extremely great significance in industrial production.

Of the thermoplastic resins, it is considered to be especially difficult to cause foaming of polyolefin resin on an industrial basis in unaltered form. The reasons for this are thought to be that the thermal fluid viscoelastic characteristics of polyolefin resins during melt processing are markedly temperature-dependent and that the thin film or membrane forming the cell walls within the foam resin is highly permeable to gases so that it is difficult to maintain gas pressure in the foam necessary for foaming. These factors have complex effects on the swelling and heat absorption that occur during foaming and on the heat of crystallization, making it difficult to establish foaming conditions. Consequently, it is a matter of common sense that, in the foaming of polyolefin resins and particularly in foaming thereof at high foaming multiples or at high expansion ratios (e.g., greater than 5) foaming is carried out with the resin being necessarily modified by crosslinking or with the resin being modified by mixture with other resins.

By exception, a technique for extrusion foaming of non-crosslinked polyolefin resin has been announced in Published Japanese Patent Application No. 4341 of 1960. However, since this method cannot be accomplished except with relatively expensive foaming agents such as 1,2-dichlorotetrafluoroethane, it has obvious economic disadvantages. In addition, the formed body that is obtained gradually begins to contract (or shrink) over time immediately after formation with the result that a formed body of the intended density cannot be obtained without restoration (or gradual recovery) of the original dimensions. Even if the dimensions are restored (or gradually recovered), a relatively long period of time is generally required for this and furrows oftentimes remain on the surface of the formed body, giving the formed product a poor external appearance. There is the further defect that there are problems relating to dimension control that have not been solved.

This invention was developed in the light of the foregoing state of affairs and it thus has the objective of providing thermoplastic synthetic resin compositions for foaming by means of which thermoplastic resin foamed bodies can be manufactured economically, and, in the case of polyolefin resins in non-crosslinked form in particular, by means of which foam formation can be carried out easily and by which the foamed body obtained exhibits little or substantially no contraction over time and is of superior dimensional stability and surface smoothness.

SUMMARY OF THE INVENTION

In accordance with the foregoing, this invention provides foamable thermoplastic synthetic resin compositions containing one or more glycol ester compounds of the formula I:

$$[(R_1CO)_l\cdot(OR_2)_m\cdot O]_n\cdot M \qquad [I]$$

wherein $R_1$ is an aliphatic hydrocarbon radical with from 10 to 24 carbon atoms;

$R_2$ is an aliphatic polyvalent alcohol residue with from 1 to 5 carbon atoms;

$l$ is a positive integer greater than 1 and less than the (alcohol valence of the $R_2$ group) $-1$;

$m$ is a positive integer greater than 1 satisfying the following equation:

$$\frac{\text{number of carbons in } R_1 \text{ group}}{m \times \dfrac{\text{number of carbons in } R_2 \text{ group}}{\text{alcohol valence of } R_2 \text{ group}}} \geqq 0.8$$

$n$ is a positive integer of from 1 to 3;

$M$ is a residue of boric acid or phosphoric acid.

The presence of the compounds of the formula I in the indicated resin compositions serves to inhibit the escape of foaming (or blowing) agent during the preparation of foamed articles from such compositions and it is believed that such fact was heretofore not known and thus constitutes knowledge new to the art.

DETAILED DESCRIPTION OF THE INVENTION

Figure 1:
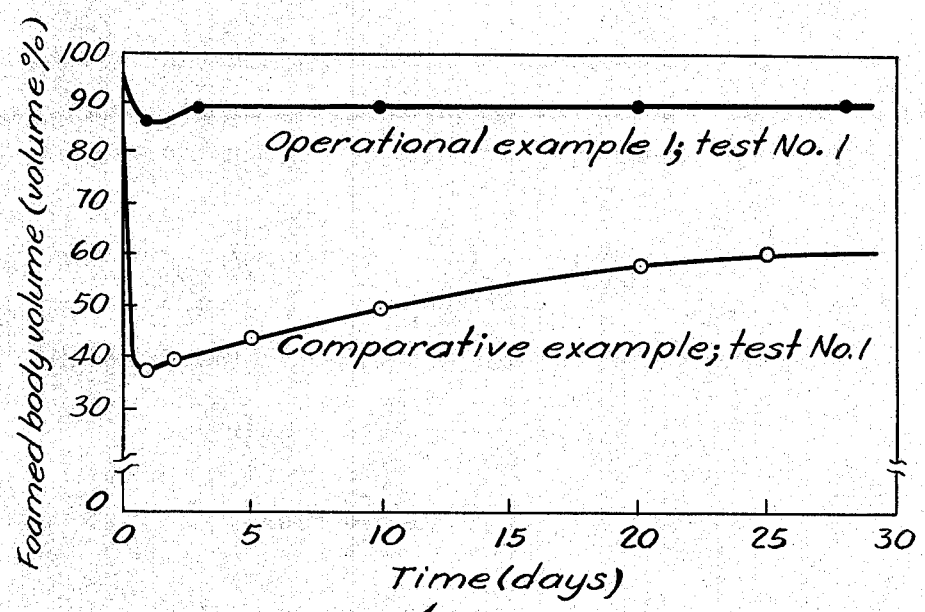
FIG. 1 is a graph showing foamed body volume (in volume percent based upon initial foam volume) as a function of time for foams formed in Test No. 1 of Operational Example No. 1 and Test No. 1 of Comparative Example 1.

In glycol ester compounds of the formula I, which are essential to this invention, $R_1$ is an aliphatic hydrocarbon radical with 10 to 24 carbons such that the unit of the formula $R_1CO$ represents the carbonyl-bearing residue of a fatty acid such as, for example, undecanoic acid, lauric acid, myristic acid, palmitic acid, stearic acid, arachic acid and behenic acid. They can be used singly or in mixtures. These carboxylic acids are generally manufactured from natural oils and fats, for which reason they are in may cases mixed substances and may, therefore, also contain some unsaturated aliphatic hydrocarbon residues. These mixed substances can also be suitably used.

$R_2$ is the hydrocarbon portion of an aliphatic polyvalent alcohol residue having 1 to 5 carbons such as, for example, methylene groups, ethylene groups, trimethylene groups and tetramethylene groups (including isomers). The polyvalent alcohol substances that can be used include polyglycol-ethers of glycol or polyvalent alcohols with 3 to 5 carbons selected from such compounds as, for example, glycerin, erythritol, pentaerythritol and arabitol. l, m and n are positive integers that are determined stoichiometrically by the selection of the aforementioned $R_1$, $R_2$ and M (residues of boric acid or phosphoric acid). These values are integers in the case of single compounds. However, mixtures are frequently used in industrial products, in which cases they may also be indicated by fractions as average values for the compound mixtures as a whole.

If the number of carbons in $R_1$ is less than 10 or more than 24, the effects of this invention cannot be obtained. Although the reasons for this are not clear, it is thought that this is due to solubility in the resin and the cohesion characteristics of compound I. Preferably, there should be 13 to 17 carbons. In addition, when the number of carbons in $R_2$ is greater than 5, the effects of this invention cannot be obtained. The reasons for this are also thought to be due to solubility and cohesion characteristics as described above. Further, the effects of this invention are exhibited by compounds in which m is a positive integer satisfying the following equation:

$$\frac{\text{number of carbons in } R_1 \text{ group}}{m \times \frac{\text{number of carbons in } R_2 \text{ group}}{\text{alcohol valence of } R_2 \text{ group}}} \geq 0.8$$

When substances that do not satisfy this essential condition are used, solubility in the resin and cohesion characteristics are outside of the desirable range and the objections of the invention cannot be achieved.

Representative compounds indicated by general formula I include tri(1-stearyl-glycero-3)borate, tri(1,2-distearyl-glycero-3)borate, tri(monostearylpolyethyleneglycol)borate, tri(monostearylpolypropyleneglycol)borate, di(1-stearyl-glycero-3)phosphinic acid esters, di(1,2-distearyl-glycero-3)phosphinic acid esters, di(monostearylpolyoxyethyleneglycol)phosphinic acid esters, di(monostearylpolypropyleneglycol)phosphinic acid esters, tri(1-palmityl-glycero-3)borate, tri(1,2-dipalmityl-glycero-3)borate, tri(monopalmitylpolyoxyethyleneglycol)borate, tri(monopalmitylpolypropyleneglycol)borate, di(1-palmityl-glycero-3)phosphinic acid esters, di(1,2-palmityl-glycero-3)phosphinic acid esters, di(monopalmitylpolyoxyethyleneglycol)phosphinic acid esters and di(monopalmitylpolypropyleneglycol)phosphinic acid esters.

The amount of compound indicated in general formal I that is added in the practice of this invention must be at least 0.1% by weight based upon the wweight of the resin, with total amount employed being in the range of from 0.1 to 10% by weight. The amount added can be selected as desired within the aforementioned range depending on the resin and foaming agent used and on the form and properties of the foamed body (density, mechanical properties, etc.). However, a range of from 0.3 to 7% by weight is generally especially desirable. When the amount added is less than 0.1% by weight, there is a marked deterioration in the external appearance of the formed body (furrowing, contraction) and it is not possible to obtain a satisfactory formed body. In addition, the properties of the formed body obtained also deteriorate. On the other hand, when an amount in excess of 10% by weight is added, there is no improvement in the effectiveness of the invention and there are economic disadvantages. In addition, a plasticizing effect is exhibited and there are also cases in which the properties of the foamed body deteriorate. Thus, this is not desirable.

The thermoplastic resins that are the constituents of this invention include polystyrene, copolymers of styrene with other monomers that can be copolymerized with styrene, and olefin polymer resins. The olefin polymer resins include those in which olefins are the sole or principal constituent, such as, for example, low density polyethylene, medium and high density polyethylene, isotactic polypropylene, polybutene-1, copolymers of ethylene or propylene with other monomers that can be copolymerized with them, such as, for example, propylene-octen-1-ethylene copolymer, ethylene-propylene copolymer, ethylene-vinyl acetate copolymer, ethylene-acrylic acid copolymer, ethylene-ethylacrylate copolymer, ethylene-vinyl chloride copolymer and zinc, sodium, calcium and magnesium salts of ethylene-acrylate acid copolymer. These resins can be used either singly or in mixtures.

The compounds of this invention can be introduced into the resin by methods of heating and kneading using such kneading machines as single axis extruding machines, biaxial extruding machines, rollers and Banbury mixers. Other methods of addition that can be used include the dry blend and master batch methods and the fusion injection method.

Known methods can be used to obtain foamed bodies using the constituents of this invention. For example, a method in which the resin constituent of this invention is melted by heating and the foaming agent is mixed and melted under high temperature and high pressure, with extrusion foaming being carried out in the low pressure range, a batch method in which the foaming agent is added to the resin constituents under high temperature and high pressure within foaming being effected by removal of pressure and a method in which the resin constituents are crosslinked with electron rays or chemical crosslinking agents, the foaming agent is introduced and foaming by heating is carried out can be selected for this objective. Of these, the effects of this invention are particularly marked in manufacturing method for highly expanded, low density foamed bodies with a foam multiple (i.e., expansion ratio) of 5 or higher by the extrusion foaming method.

The foaming agents that can be used during manufacture of the foamed body include ordinary chemical foaming agents and volatile organic foaming agents. Volatile organic foaming agents are particularly desirable and any foaming agent which, at atmospheric pressure, boils below the melting point of said thermoplastic resin may be used. Hydrocarbons are representative examples and may include propane, butane, pentane, ppentane, hexane, hexene, heptane and octane. They may aalso include halogenated hydrocarbons that meet the same limitation in respect to boiling point. The halogenated hydrocarbons that can be used include, for example, methylene chloride, trichlorofluoromethane, dichlorofluoromethane, chlorodifluoromethane, chlorotrifluoromethane, dichlorodifluoromethane, 1,1'-dichloroethane, 1-chloro-1,1'-difluoroethane, 1,2-dichlorotetrafluoroethane, chloropentafluoroethane and similar halogenated hydrocarbons. Mixtures of these substances are also useful. The chemical foaming agents include azodicarbonamide, azobisisobutyronitrile, dinitrosopentamethylenetetramine and p-toluenesulfonyl hydrazide. Mixtures of chemical foaming agents and the aforementioned volatile organic foaming agents are also useful.

In addition to the aforementioned compounds and foaming agents, the foaming constituents may ordinarily contain small amounts of metallic soaps such as zinc stearate and minutely pulverized inorganic substances such as calcium silicate as lubricating agents and foaming regulators. Depending on the circumstances, agents for preventing deterioration due to ultraviolet irradiation, agents for preventing electric charging, stabilizing agents, coloring agents and lubricants can be added in amounts less than 5% by weight.

The method of this invention is applicable to foamed products of various forms, such as, for example, the manufacture of sheets, blocks, rods and tubes and electric wire and cable coverings as well as formed products.

The following methods and standards are useful for evaluation purposes in the practice of the present invention.

The effectiveness of this invention is evaluated on the basis of the contraction (or shrinkage) ratio after foaming and of the state of the surface of the foamed body after dimensional stabilization.

In the examples which follow the contraction ratio after foaming (volume %) is calculated as follows:

$$\text{contraction ratio at "n" days after foaming} = \left(1 - \frac{\text{volume of foamed body after "n" days}}{\text{volume of foamed body immediately after foaming}}\right) \times 100$$

The foamed body which is employed as the test sample in measuring the contraction ratio is formed into a round rod (about 25 mm in diameter and about 50 cm in length). The diameter is measured with slide calipers and the length is measured with a steel rule. The volume calculated on the basis of the dimensions as measured immediately after foaming and formation are taken as the criteria and determinations of diameter and width are made in the same way after "n" days. Volume is calculated and the contraction ratio is found on the basis of the foregoing equation.

The relative evaluation of the surface characteristics of the foamed body after dimensional stabilization in the following examples is as follows:

| Rating | Surface Characteristics |
| --- | --- |
| Good = | Almost no furrows and excellent smoothness. |
| Fair = | Furrows can be seen with the unaided eye but product is suitable as an ordinary product. |
| Poor = | Many furrows and inferior in terms of value as a commercial product. |

From the industrial and practical standpoints, contraction of the foamed body should be as small as possible. A contraction ratio in the initial period (1 day after foaming) of less than about 15% is required. When it is greater than this, an extremely long period (over 1 month) is required for recovery of the original dimensions and for attainment of acceptable dimensional stability and the surface state of the foamed body also deteriorates. In addition, the difference between the contraction ratio in the initial stage and the contraction ratio after 10 days should be within about 10%. When it is greater than this, control of dimensions is poor, and; as the result, there are great variations in the dimensions of the products.

The following operational examples serve to further illustrate the substance of the present invention. In such examples, the values for parts and percentages are on a weight basis unless otherwise specified.

OPERATIONAL EXAMPLE 1 AND COMPARATIVE EXAMPLE 1

| Resin: | |
| --- | --- |
| Ethylene-vinyl acetate copolymer (Vinyl acetate content: 10%; density: 0.93 g/cm$^3$; MI = 1.5; Sumitomo Chemicals Ebatate ® (D-2021) | 100 parts |
| Foam regulating agent: | |
| Calcium stearate | 0.1 parts |
| Calcium silicate | 0.6 parts |

Various constituents to which had been added the aforementioned resin and foam regulating agent together with the compounds shown in Table I were passed through a single screw extruding machine with a diameter of 40 mm and equipped with an extrusion die having a round opening of 5 mm in diameter and melted. They were then kneaded with volatile organic foaming agent supplied separately to said extruding machine, with extrusion foaming occurring from the extrusion die.

In Table I, compounds A, B, C and D are, respectively, tri(1-stearyl-glycero-3)borate, tri(1,2-distearyl-glycero-3)borate, tri(monopalmitylpolyoxyethyleneglycol)borate (m of the formula I=7) and tri(monopalmitylethyleneglycol)borate. Foaming agents I, II and III are, respectively, dichlorodifluoromethane, 1,2-dichlorotetrafluoroethane and butane.

The constituents in the tests of Comparative Example I were foamed by the same method as in Operational Example 1 except that the additives were varied and the results for such comparative tests are summarized in Table I below.

In such comparative tests, contraction occurred after foaming in all cases. Recovery to the state existing immediately after foaming did not occur even after the materials had been set aside for a long time. The surfaces of the foamed bodies that were obtained werwere markedly uneven and furrowed and the quality of the products were poor. In Table I, the additives A', A", C' and D' are, respectively, tri(1-capryl-glycero-3)borate, tri(1-cerotyl-glycero-3)borate, tri(monopalmitylpolyoxyethyleneglycol)borate (m of the formula I=20) and tri(monocaprylethyleneglycol)borate.

Figure 2:
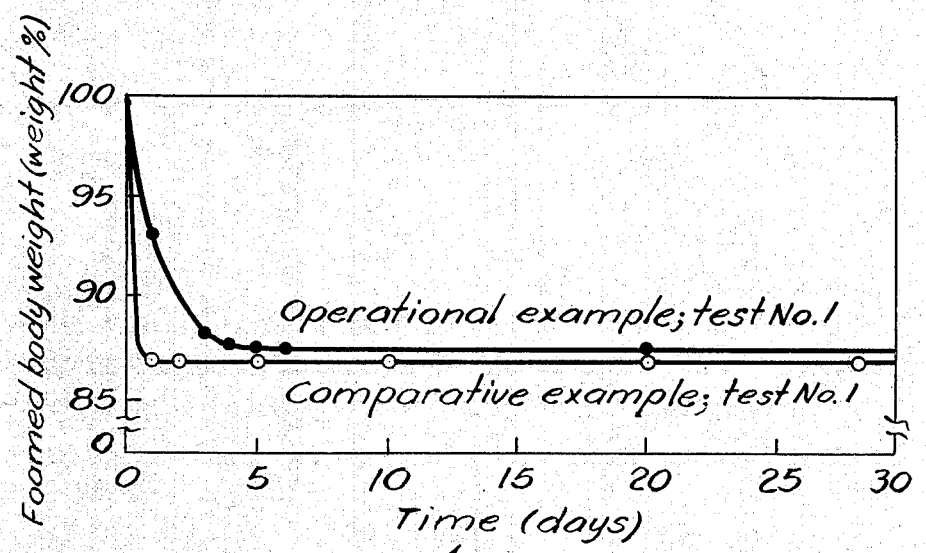
FIG. 2 is a graph showing foamed body weight (in weight percent based upon initial foam weight) as a function of time for Test No. 1 of Operational Example 1 and for Test No. 1 of Comparative Example 1.

FIG. 1 and FIG. 2 show the changes in volume and weight of the foamed bodies over time for Test No. 1 of Operative Example 1 versus Test No. 1 of Comparative Example 1. As is illustrated in FIG. 1, in cases in which the constituents of this invention were foamed, the changes in volumes of the foamed bodies over time were extremely small and superior foamed bodies were obtained. As is illustrated in FIG. 2, when weight changes were compared, it was found that transmission of foaming agent gas had been inhibited by the practice of the invention. In addition, the surfaces and external appearances of the resulting foamed bodies of the invention were found to be of superior quality.

OPERATIONAL EXAMPLE 2 AND COMPARATIVE EXAMPLE 2

Extrusion foaming was performed under conditions the same as those in Operational Example 1 and Comparative Example 1 except that polyethylene (density: 0.919 g/cm³; M I=2.0; Asahi-Dow F-1920 ®) was used as the resin and [a mixture of] 0.06 parts of calcium stearate and 0.36 parts of calcium silicate was used as the foam regulating agent. The results are summarized in Table II below.

onds). The primary foam particles that were obtained were uniform foam particles with a density of 90 kg/m³. Next, these primary foam particles were introduced into a pressure-resistant container and were treated for 15 hours at 80° C. while being pressurized in an atmosphere of 10 kg/cm² G. Foaming was effected by passing through water vapor at a pressure of 0.32 kg/cm² G and secondary foam particles with a density of 25 kg/m³ were obtained.

These secondary foam particles were compressed at an atmospheric pressure of 1.5 kg/cm², and, in that

TABLE I

| Test No. | Additive[1] Type | Additive[1] Amount | Foaming agent[1] Type | Foaming agent[1] Amount | Density of foamed body (g/cm³) | Contraction of foamed body (volume %) Maximum value | Contraction of foamed body (volume %) After 10 days | State of foamed body after dimensional stabilization (30 days) |
|---|---|---|---|---|---|---|---|---|
| Operational Example 1 | | | | | | | | |
| No. 1 | A | 0.7 pt | I | 21 pt | 0.035 | 14.7 | 11.2 | Good |
| No. 2 | A | 0.7 pt | II | 28 pt | 0.034 | 12.9 | 10.5 | Good |
| No. 3 | B | 0.7 pt | I | 21 pt | 0.035 | 14.7 | 11.0 | Good |
| No. 4 | B | 0.7 pt | II | 28 pt | 0.034 | 12.8 | 10.3 | Good |
| No. 5 | C | 0.7 pt | I | 21 pt | 0.033 | 14.6 | 10.7 | Good |
| No. 6 | D | 0.7 pt | I | 21 pt | 0.033 | 14.5 | 10.6 | Good |
| Comparative Example 1 | | | | | | | | |
| No. 1* | None | | I | 21 pt | 0.040 | 64.6 | 51.2 | Poor |
| No. 2* | None | | II | 28 pt | 0.030 | 33.4 | 25.7 | Poor |
| No. 3* | A' | 0.7 pt | I | 21 pt | 0.037 | 28.5 | 26.5 | Poor |
| No. 4* | A" | 0.7 pt | I | 21 pt | 0.036 | 30.5 | 27.5 | Poor |
| No. 5* | C' | 0.7 pt | I | 21 pt | 0.038 | 35.8 | 29.4 | Poor |
| No. 6* | D' | 0.7 pt | I | 21 pt | 0.037 | 34.8 | 29.0 | Poor |

*Not an example of the invention.
[1]pt = parts by weight.

TABLE II

| Test No. | Additive[1] Type | Additive[1] Amount | Foaming agent[1] Type | Foaming agent[1] Amount | Density of foamed body (g/cm³) | Contraction of foamed body (volume %) After 1 day | Contraction of foamed body (volume %) After 10 days | State of foamed body after dimensional stabilization (30 days) |
|---|---|---|---|---|---|---|---|---|
| Operational Example 1 | | | | | | | | |
| No. 1 | A | 0.7 pt | I | 20 pt | 0.031 | 12.4 | 12.3 | Good |
| No. 2 | A | 0.7 pt | III | 20 pt | 0.031 | 14.8 | 15.5 | Good |
| No. 3 | B | 0.7 pt | I | 20 pt | 0.030 | 12.3 | 12.2 | Good |
| No. 4 | B | 0.7 pt | III | 20 pt | 0.031 | 14.7 | 15.4 | Good |
| No. 5 | C | 0.7 pt | I | 20 pt | 0.030 | 12.3 | 12.1 | Fair |
| No. 6 | D | 0.7 pt | I | 20 pt | 0.031 | 12.4 | 12.2 | Fair |
| Comparative Example 1 | | | | | | | | |
| No. 1* | None | | I | 20 pt | 0.035 | 55.4 | 30.0 | Poor |
| No. 2* | None | | III | 20 pt | 0.033 | 61.2 | 48.5 | Poor |
| No. 3* | A' | 0.7 pt | I | 20 pt | 0.034 | 59.2 | 32.4 | Poor |
| No. 4* | A" | 0.7 pt | I | 20 pt | 0.035 | 60.0 | 30.5 | Poor |
| No. 5* | C' | 0.7 pt | I | 20 pt | 0.034 | 58.2 | 52.0 | Poor |
| No. 6* | D' | 0.7 pt | I | 20 pt | 0.034 | 59.1 | 30.2 | Poor |

*Not an example of the invention.
[1]pt = parts by weight.

OPERATIONAL EXAMPLE 3

0.3% by weight of dicumyl peroxide as a crosslinking agent and 1.5% by weight of contraction preventing agent A were kneaded and introduced into a polyethylene resin of the same kind used in Operational Example 2. The crosslinked polyethylene resin (spherical diameter, 1.2 mm), which had a gel ratio of 60%, was impregnated with dichlorodifluoromethane under increased pressure and increased temperature in a pressure-resistant container, after which the product was cooled. The foam polyethylene particles (containing 14% by weight of dichlorodifluoromethane) that were obtained were foamed by heating in water vapor (heating conditions and water vapor pressure of 0.23 kg/cm² G, 45 seconds) state, were packed into the metal pattern of a mold forming machine (Model ECHO-120 manufactured by Toyo Kikai Kinzoku (Ltd.)). The formed body was made by heating in water vapor at a pressure of 1.2 kg/cm² G. The density of the foamed body that was obtained was 31 kg/m³. There was superior fusion between particles and the independent foam characteristics was under 0.01.

COMPARATIVE EXAMPLE 3

Foam particles were manufactured by the same method as in the Operational Example 3 except that contraction-preventing agent A was not added. The density of the primary foam particles that were obtained was 110 kg/m³ and the density of the secondary foam particles was 30 kg/m³. When these particles were compared with those obtained in Operational Example 3, they were in all cases found to be contracted and there were many furrows on their surfaces.

The useful life of the foam particles impregnated with foaming agent pursuant to this comparative example were far shorter than those in Operational Example 3, with that of the comparative example being only 20 minutes whereas the comparable time period for the material of Operational Example 3 was about 6 hours.

In addition, when the foamed bodies that had been formed were compared with those obtained in Operational Example 3, independent foaming (i.e., free foaming) was found to be greater and their buffering capacity and mechanical properties were inferior.

OPERATIONAL EXAMPLE 4

A resin constituent consisting of 1 part by weight of tri(1-stearyl-glycero-3)borate and 0.5 part by weight of talc added to 100 parts by weight of polystyrene resin (Asahi-Dow brand Styron® 680, M I=8.0) was foamed by the same method as in Operational Example 1 using 10.0 parts by weight of dichlorodifluoromethane (F-12).

When the weight of the foaming agent in the foamed body that was obtained (the density of the foamed body being 40 kg/m³) was determined, it was found to be 9.5 parts by weight/100 parts by weight of resin.

COMPARATIVE EXAMPLE 4

A foamed body was obtained by the same method as in Operational Example 4 except that tri(1-stearyl-glycero-3)borate was not added.

The weight of the foaming agent in the foamed body (its density being 40 kg/m³) was 7.4 parts by weight/100 parts by weight of resin.

Based upon a comparison between Operational Example 4 and Comparative Example 4, it can be seen that the gas efficiency of the foaming agent is substantially improved by addition of small amounts of the compounds of this invention (i.e., of the formula I above).

While the present invention has been herein described and illustrated by reference to specific examples and embodiments thereof, such specific examples and embodiments are not to be understood as limiting the scope of the instantly claimed invention.

What is claimed:

1. A foamable thermoplastic synthetic resin composition containing a polymer selected from the group consisting of styrenic and olefin polymers, a blowing agent and at least one glycol ester compound of the formula I below in an amount of 0.1 to 10% by weight in respect to the resin:

$$[(R_1CO)_l \cdot (OR_2)_m \cdot O]_n \cdot M \qquad (I)$$

wherein,
$R_1$ is an aliphatic hydrocarbon radical with 10 to 24 carbons;
$R_2$ is an aliphatic polyvalent alcohol resin residue with 1 to 5 carbons;
l is a positive integer greater than 1 and less than the (alcohol valence of the $R_2$ group) $-1$;
m is a positive integer greater than 1 satisfying the following equation:

$$\frac{\text{number of carbons in } R_1 \text{ group}}{m \times \frac{\text{number of carbons in } R_2 \text{ group}}{\text{alcohol valence of } R_2 \text{ group}}} \geqq 0.8;$$

n is a positive integer of from 1 to 3; and
M is a residue of boric acid or phosphoric acid.

2. The foamable thermoplastic resin composition of claim 1 wherein the thermoplastic synthetic resin is polyethylene or a copolymer of ethylene with one or more other monomers copolymerizable therewith.

3. A low density, closed-cell synthetic resin foam article derived from the foamable thermoplastic resin composition of claim 1.

4. In a process for preparing a low density, closed-cell synthetic resin foam article by admixing a resin selected from the group consisting of styrenic and olefin polymers in molten form and under elevated pressure with a blowing agent and by thereafter releasing the resulting mixture to a zone of lower temperature and pressure, the improvement comprising incorporating into said molten resin/blowing agent mixture, prior to its release to said lower temperature and pressure zone, from 1.0 to about 10 weight percent based upon the weight of said resin of a glycol ester compound of the formula I below:

$$[(R_1CO)_l \cdot (OR_2)_m \cdot O]_n \cdot M \qquad (I)$$

wherein,
$R_1$ is an aliphatic hydrocarbon radical with 10 to 24 carbons;
$R_2$ is an aliphatic polyvalent alcohol resin residue with 1 to 5 carbons;
l is a positive integer greater than 1 and less than the (alcohol valence of the $R_2$ group) $-1$;
m is a positive integer greater than 1 satisfying the following equation:

$$\frac{\text{number of carbons in } R_1 \text{ group}}{m \times \frac{\text{number of carbons in } R_2 \text{ group}}{\text{alcohol valence of } R_2 \text{ group}}} \geqq 0.8;$$

n is a positive integer of from 1 to 3; and
M is a residue of boric acid or phosphoric acid.

* * * * *